Jan. 11, 1927.
L. R. ZIFFERER
1,614,270
SPOON
Filed Feb. 15, 1926
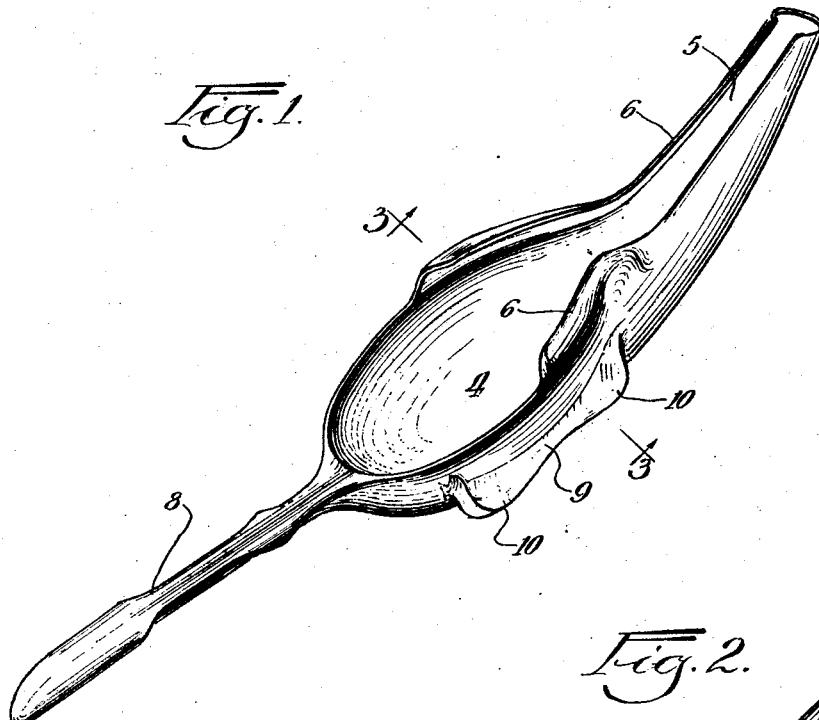
Inventor:
Lothar R. Zifferer, Patented Jan. 11, 1927.

1,614,270

UNITED STATES PATENT OFFICE.

LOTHAR R. ZIFFERER, OF COLUMBIA, PENNSYLVANIA.

SPOON.

Application filed February 15, 1926. Serial No. 88,239.

This invention relates to a spoon for administering to animals medicine, tonic, nourishment, and the like. The present improvements have to do with certain features which conduce to simplicity in construction, facility in its application, and protection against loss of contents.

In the accompanying drawing is set forth an exemplification of my invention in the manner following—

Figure 1 is a perspective view looking down from above upon the spoon;

Fig. 2 is a bottom plan view thereof; and

Fig. 3 is a transverse section therethrough taken about on line 3—3 of Fig. 1.

In the form shown, the spoon is equipped with a concave bowl 4 from one end of which extends an open spout 5. The walls of the spout which are extended upwardly and then inwardly in the form of flanges as at 6 continue back in this wise for a portion of the bowl length. At the sides of the bowl the walls are outwardly bowed as at 7. A handle 8 connects with the bowl at its rear end for manipulation of the spoon.

Upon the under side of the bowl I provide a pair of ribs 9 which provide at their ends four bearing points 10 on which the spoon may rest. These bearing points are so located with respect to the bowl as to lie always to the outside of the spoon center of gravity thereof whereby the bowl is prevented from tipping over. This relationship is apparent in Fig. 3 where an extreme tilted position of the spoon is indicated by dotted lines. Also these bearing points are similarly located with reference to the spoon length, that is the spout 5 and handle 8 are in counterbalance whereby the spoon tends to right itself in case it is tilted either forwardly or rearwardly.

It will be observed that the walls of the bowl extend up in such fashion as to keep most of its contents from spilling even though the spoon be tipped transversely or longitudinally to an extreme position. The extent to which the spoon can be tipped in any direction is very limited, being guarded by the outwardly flaring bowl walls on the sides and by the spout and handle on the front and rear. As above stated, the location of the four bearing points is such that the spoon will right itself if tipped in any direction. This is of great advantage in an article of this kind designed for the treatment of animals, inasmuch as the confusion attending its use may result in accidental tipping. When constructed according to the present invention, however, no harm can come from this occurrence, since the contents of the spoon are protected from spilling and the spoon will tend to right itself at once.

An article of this kind may conveniently be made from a single piece of metal, cast, stamped, or otherwise formed to shape. By reason of the inwardly extending flanges along the bowl and spout, it is impossible for the animal to grip the spout in such a way as to obstruct the passage of the medicine, tonic, or nourishment, which is being administered. Furthermore, by preserving an open space between these flanges the spoon may easily be kept clean and in sanitary condition. Additionally it is possible to administer a viscous liquid, such as castor oil, and to observe always through the open upper sides of the spout the amount of material remaining in the spoon during treatment of the animal.

I claim:

1. A spoon of the kind described, which comprises a bowl one end of which is formed into a spout, the walls of the bowl and spout being continuous and extending upwardly and inwardly toward each other, but leaving always a space therebetween, a handle extended from the opposite bowl end in counter-balance to the spout, the bowl being disposed substantially midway between the free ends of the handle and spout, and means depending from the bowl forming a support for the spoon at points outside its center of gravity whereby the spoon is rendered self-righting, substantially as described.

2. A spoon of the kind described having a bowl from which a pouring spout is extended at one end, the spout being provided with walls which extend upwardly and inwardly toward each other, but with a clearance therebetween for its entire length, and the bowl being provided similarly with walls which are extended inwardly toward each other but with a clearance therebetween, a handle aligned with the spout and extending from the bowl at the end thereof which is opposite the spout, and means depending from the bowl providing four bearing points on which the spoon may be rested, the points of bearing being so located with reference to the center of spoon gravity as to hold the same normally in a level position and to return the same thereto from any other tilted position, substantially as described.

3. A spoon of the kind described having a concave bowl with depending bearing points inwardly of its side walls which are outwardly bowed, a spout communicating with the bowl at one end and a handle secured to its other end, said spout and handle being disposed above a plane whereon the bearing points may be resting and affording stops for longitudinal tilting of the spoon, the bowed bowl walls also affording stops for transverse tilting of the spoon, the spout and handle being in counterbalance with the spoon whereby it is self-righting from any tilted position, substantially as described.

4. A spoon of the kind described having a bowl from opposite ends of which are extended a handle and spout, the one in counterbalance to the other, the bowl walls being concave and terminating in upper edges which extend toward each other and partially over the bowl, the spout being formed also with walls which extend upwardly and inwardly toward each other, but with a clearance therebetween for its entire length, and merging with the bowl walls whereby to provide for the spoon a smooth continuous lateral enclosure open along its top throughout its entire length, and means formed on the under side of the bowl providing a rest for the spoon, substantially as described.

L. R. ZIFFERER.